Figure 1:
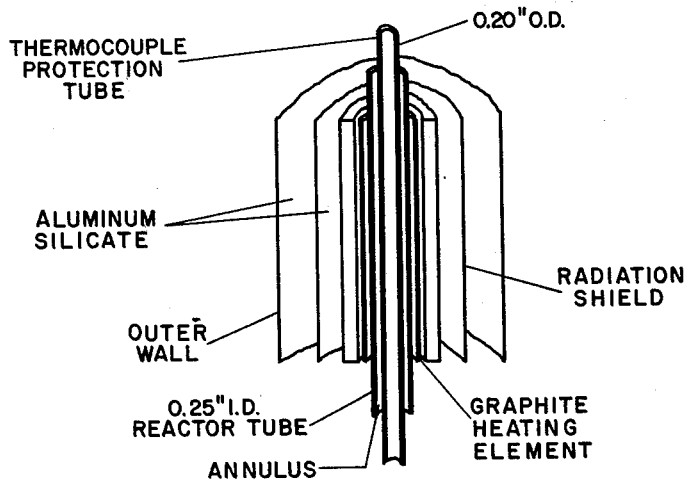

Nov. 10, 1964     J. HAPPEL     3,156,734
PYROLYSIS OF METHANE-HYDROGEN MIXTURES
Filed May 22, 1961     3 Sheets-Sheet 1

JOHN HAPPEL
*INVENTOR.*

BY 3,156,734
PYROLYSIS OF METHANE-HYDROGEN
MIXTURES
John Happel, 69 Tompkins Ave.,
Hastings on Hudson, N.Y.
Filed May 22, 1961, Ser. No. 111,646
9 Claims. (Cl. 260—679)

This invention relates to the pyrolysis of methane diluted or admixed with hydrogen to give relatively uncontaminated mixtures of acetylene and hydrogen as products. More particularly, the present invention relates to an improved method of obtaining acetylene and hydrogen as essentially the only products of pyrolysis of methane employing a unique combination of carefully controlled operating conditions.

The pyrolysis of hydrocarbons to acetylene, hydrogen and other products is well known. Heretofore, however, the isolation of acetylene and/or hydrogen in a relatively pure state prepared by such a procedure has required elaborate product separation and product recovery techniques. Thus, initially devised and previously known straight pyrolytic procedures such as the Wulff and Ruhrchemie processes have yielded, in addition to acetylene and hydrogen, variable amounts of alkynes other than acetylene, olefins including ethylene, and paraffins, including a portion of the original methane feed in amounts normally sufficient to require laborious isolation and recovery procedures to make the process practical. Modified processes include that employed for the partial combustion of methane and that in which methane is mixed with hot combustion products to yield product streams containing large quantities of carbon dioxide, carbon monoxide and steam in addition to the products normally obtained from straight pyrolysis as described above.

One process employing electrical energy which has been in commercial operation is the one developed at the acetylene plant of Chemische Werke Hüls in Germany. This process employs an electric arc for heating the gaseous hydrocarbon feed. In this reactor, it is not precisely known at what temperature the acetylene actually forms from the methane; however, in its core the arc burns at about 3000° C. while at the end of the reactor tube the temperature runs between 1600 and 2000° C., so that it is readily apparent that while a portion of the reacting feed gases is subjected to arc temperature, i.e. around 3000° C., a substantial portion bypasses the hottest part of the arc and is pyrolyzed at substantially lower temperatures. Consequently, the over-all process involves an essentially uncontrolled time-temperature pyrolysis which leads on the one hand to the production of acetylenic hydrocarbons such as diacetylene and other alkynes in substantial amounts as the result of extremely high temperature pyrolysis and at the same time lower temperatures leave a considerable proportion of unreacted methane in the effluent gases.

Due to the presence of these contaminants and the elaborate procedures required for the effective separation of acetylene and hydrogen therefrom, isolation of these components has normally constituted the most expensive phase of prior pyrolytic processes.

Although it has been reported that at temperatures above 1500° C., pressures well below 100 mm. Hg abs. are necessary for satisfactory operation, it has been found that operation of the process at temperatures up to at least 1900° C. are possible at 100 mm. Hg abs. and even higher pressures using a pure methane feed. Satisfactory operation has been achieved even when almost all of the methane feed has disappeared, and when the gaseous effluent from the pyrolysis process consisted of a practically pure mixture of acetylene and hydrogen.

Obviously, such a product stream has many advantages for industrial applications as such, and also, it simplifies the procedure for acetylene recovery and purification in cases where pure acetylene is the desired product.

The process has three areas of advantage. First, it is possible by proper choice of conditions to produce essentially a mixture of acetylene and hydrogen, so that when acetylene is recovered or reacted practically only pure hydrogen remains. Secondly, yields of acetylene based on methane consumption are between two and three times greater than in present commercial processes. Thirdly, energy consumption is consequently much lower than in other processes, including also the traditional carbide process, which incidentally these other processes based on hydrocarbons have not been able to displace.

Accordingly it was believed desirable to study the reaction of methane pyrolysis further to preserve the advantages of the process as already described but at the same time avoid the necessity for operation of the process under vacuum with its attendant disadvantages.

It has now been further discovered that at the controlled temperature conditions of the pyrolysis of methane as employed, hydrogen when used as a diluent is unusually effective and gives unexpected and totally unpredictable advantages. It has been claimed by others, that by employing various diluent gases the same effect is achieved as in operation under vacuum, provided that the partial pressure of methane is maintained by the dilution the same as in the vacuum operation. In this new process, however, greatly improved results are obtained by using hydrogen. It has been found possible to operate with methane-hydrogen mixtures at methane partial pressures of about 350 mm. Hg without excessive coke formation while converting methane to acetylene. The yields of acetylene are comparable to those using a pure methane feed.

While it is not intended in any way to limit the advantages of the invention to a theory, one explanation of the surprising effectiveness of hydrogen may be that during the initial stages of methane pyrolysis, carbon formation is suppressed by the hydrogen, which is of course, not present at the start of the reactor when using pure methane feed in vacuum operations. However, there may be other, better explanations, such as increases in the heat transfer rates, or other changes in the physical nature of the system.

When used in the selective, high temperature process described, hydrogen has another unique advantage, because the process, itself, can produce a relatively pure hydrogen stream after the removal of acetylene from the effluent gas; thus, no elaborate separation procedure is necessary for the removal or recovery of unreacted methane from the effluent. On the other hand, if unreacted methane is not removed in the case of other pyrolysis processes described in the past art, the methane discarded in the effluent gas constitutes an immediate loss in the methane utilization efficiency. Furthermore, the heating and cooling of unconverted methane results in a waste of energy which increases the cost of operation.

Moreover, in flame type processes, in which the effluent gases are contaminated by large amounts of carbon monoxide and carbon dioxide, the use of hydrogen as a diluent becomes impractical and is not indicated since undesirable reactions would occur at the high temperatures. Thus, the present process enables hydrogen dilution to be employed for the first time in a practical manner in the manufacture of acetylene.

However, it is not necessary to restrict the operation of the process to the use of pure hydrogen. For example, if it is desired to use the hydrogen produced by this process in the manufacture of ammonia, a mixture containing up to one part nitrogen either free or combined for every three parts of hydrogen (total of hydrogen in feed and expected from pyrolysis) can be employed. Such a mixture would have obvious advantages, if the feed to the ammonia process were to be freed from trace impurities by means of a liquid nitrogen wash, since effluent hydrogen from such a wash step would naturally contain nitrogen. In a similar fashion, if the hydrogen were to be used for methanol manufacture, carbon monoxide, carbon dioxide, or other gases or their mixtures or compounds with each other would be operable. Furthermore, in this process the concentration of acetylene in the effluent is sufficiently high to permit its use directly without further separation steps, in processes using acetylene as a reactant.

The process of the invention comprises introducing a mixture of methane and hydrogen into a reaction zone wherein the maximum temperature within the effective reaction zone is above 1400° C.; withdrawing the effluent from said reaction zone and at the point of withdrawal quenching the effluent to a temperature of about 600° C. or less; lower temperatures are operable and desirable. Since the gas is primarily being heated during its passage through the reactor, and is being heated and cracked during its passage through the effective reaction zone, the temperature of the gas reaches some maximum temperature during its passage through the reaction zone, prior to the quench. It is this maximum temperature which is said to characterize the reaction and which is referred to as the maximum reaction zone temperature. Maximum temperatures within the reaction zone of 1450° C. to 2000° C. are generally preferred while a carefully controlled maximum temperature within the range of about 1500° C. to 1800° C. normally affords optimum yields in addition to ultimate freedom from contaminants.

The space velocity, $Sv$, is stated as:

$$Sv = V_f/V_r$$

where $V_f$ = flow rate of feed gases, ft.$^3$/sec. measured at 0° C. and 760 mm. Hg abs.
$V_r$ = reactor volume, ft.$^3$ However, in this improved process since the feed gas is not pure methane, but a mixture of methane and hydrogen, a new term hereafter referred to as effective space velocity has been defined as follows:

Effective space velocity $$Se = \frac{Sv}{P} = \text{sec.}^{-1} \text{ atm.}^{-1}$$

wherein P is the total reactor pressure in atmospheres.

For the purposes of this application, including the claims, the foregoing formula for effective space velocity is the definition of the effective space velocity for the reaction.

The reactor volume is calculated from that point at which the gas reactant feed first reaches a temperature within about 250° C. of the maximum reactor temperature to that point at which quenching takes place. The proportions of hydrogen to methane in the feed to the reactor zone is in the range 1:1 to 39:1 in mole ratios. Accordingly, the range of values of $Se$ over which this process is operable is 0.72 sec.$^{-1}$ atm.$^{-1}$ to 70.7 sec.$^{-1}$ atm.$^{-1}$.

It is necessary in this selective pyrolysis to define carefully the reaction zone in which the principal part of the pyrolysis occurs, and to which it is in fact desired to confine the pyrolysis reaction. To define conditions and control temperatures, the beginning of the reaction zone is taken to be that point at which the temperature of the reacting gases first reaches a level of about 250° C. below the maximum temperature in the reactor; the end of the reactor zone is considered to be the point of quenching.

In this reaction zone so defined, the gas temperature is estimated to be within 100° C. of the wall temperature. Thus, a substantially isothermal reaction zone is obtained considering the relatively high temperature level of the zone. This is emphasized as very important since substantial amounts of pyrolysis at lower temperature levels will result in undesirable degradation of the methane to coke and products other than acetylene.

It will be evident from the relatively short time afforded the reacting gas within the reaction zone that the aforesaid maximum temperatures must be attained in a very abbreviated period. It will also be apparent that the descent of the gas to temperatures substantially below the maximum involves rapid quenching commensurate with the abbreviated time in the reaction zone. Such quenching or cooling should be effected preferably to a temperature of 300° C. or less. Normally, however, rapid cooling to a temperature of 600° C. or less, e.g., 500° C. is operable and desirable. By virtue of such cooling, decomposition, hydrogenation or polymerization of the product acetylene is avoided. This is especially important where hydrogen is present. Cooling to ambient temperatures may then proceed at a somewhat slower and more conventional rate. To achieve the high rate of initial cooling, injection of cold gas or liquid into the product gas is normally employed. It is, of course, preferred that the gas or liquid entrained or admixed with the hot product gases, be of such a nature, that it does not contaminate the product stream with gases which are difficult to remove and which would thus negate certain advantages of the invention. The effluent may be quenched by expansion through a de Laval nozzle so as to secure a rapid drop in temperature. The high velocity effluent gases thus attained may be passed through a turbine to extract a portion of their energy or they may be mixed with water or another quenching medium. The pressure within the reaction zone is essentially atmospheric, although higher pressures up to 5 atmospheres may be employed as a convenient pressure level limit in commercial recovery operations. Yields will vary with hydrogen dilution.

The feed material for the production of the acetylene to the reactor need not be pure methane. Commercial sources of methane, i.e., from natural gas, coke oven gas, etc. contain small amounts of other hydrocarbons, and these are not a detriment. Also, as noted previously, varying amounts of gases such as nitrogen may be present to advantage in the feed stream along with the hydrogen dilution stream. Small amounts of gases such as for example, oxygen, carbon monoxide and carbon dioxide may also be present.

When hydrocarbons of higher molecular weight than methane are subjected to temperatures within the range of this invention, it is known that the products of such pyrolysis include methane; the decomposition of methane so formed will proceed to the formation of acetylene and hydrogen if carried out under the conditions of this invention. Thus, it is evident that if higher molecular weight hydrocarbons than methane are used as such or are present as impurities in the methane feed stock, the reaction will proceed in substantially the same manner as the pyrolysis of methane from an original methane feed stock. Further, since the primary splitting of the heavier hydrocarbons occurs more rapidly than the cracking of methane itself, the cracking of methane will likewise be the controlling step in the pyrolysis of these heavier hydrocarbons to produce acetylene. Thus, the optimum effective space velocity within the reactor for higher hydrocarbon pyrolysis may be towards the shorter end of the range recited hereinabove; that is, where $Se$ is near 0.5 atm.$^{-1}$ sec.$^{-1}$. Further, in the past, it has been found that at desirable levels of reactor pressure, it is very difficult to operate with hydrocarbons of higher molecular weight than methane because the rate of coke and tar formation is, comparatively, very high. From the behavior of methane in the presence of hydrogen, it is expected that the higher hydrocarbons, with proper hydrogen dilution, could also be conveniently pyrolyzed to acetylene and hydrogen in a similar manner. For example, higher hydrocarbons might be pyrolyzed by this process to give high yields of acetylene and hydrogen, for example, ethane and the like.

Figure 2:
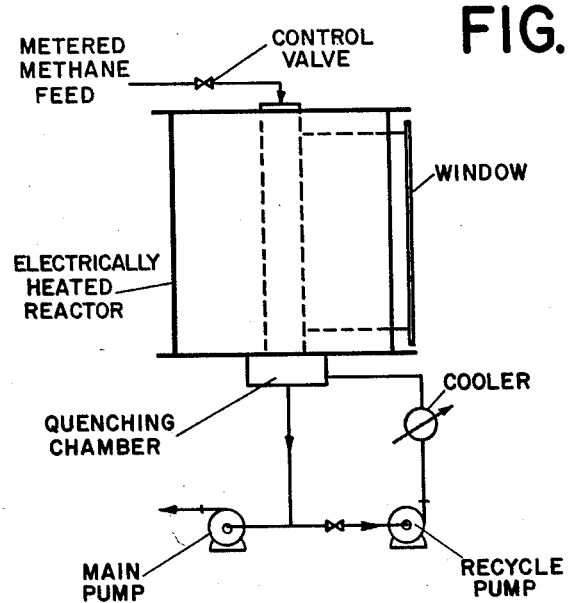
Figure 3:
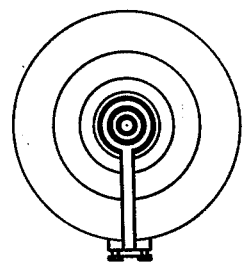

An illustrative arrangement for use in the practice of the present invention on the laboratory scale is shown in accompanying FIGURES 1 to 3. FIGURE 1 is a diagrammatic representation of the elements of this illustrative apparatus wherein the carefully metered methane feed, suitably diluted with hydrogen, is caused to pass through an electrically heated reaction chamber and is rapidly quenched under the conditions described hereinabove. Thus, for example, the maximum temperature within the reaction zone will be within the above described range, e.g. 1750° C. The methane feed and the hydrogen diluent are withdrawn from storage, metered, and passed through control valves. At this point, the desired concentration of the hydrogen diluent is provided by a metered amount of hydrogen being incorporated into the feed stream of methane. The pressure of the feed material is measured and the feed stream proceeds to the electrically heated reactor. Alternately, the methane stream and the hydrogen diluent could be metered separately and passed as separate streams into the reactor, i.e. the gas feed entering the furnace can be a premixed stream of hydrogen and methane or they can be fed separately.

A suitable reactor for carrying out the herein described reaction is seen in inside elevational view in FIGURE 2 and in cross-section in FIGURE 3. As represented in these drawings, which are intended to be illustrative only for use in the practice of the invention and not limitative thereof, the reactor is seen (FIGURE 3) to be a concentric system of cylindrical tubes which are progressively larger in diameter.

The methane containing feed passes through the length of the reactor and outside the smaller tube, which protects the thermocouple which measures temperatures within the reactor. The thermocouple arrangement is composed of an alumina thermocouple protection tube and a platinum-platinum - 10% rhodium thermocouple wire disposed therein along the length of the substantially vertically disposed thermocouple protection tube. This thermocouple protection tube is disposed within and along the length of the larger reactor tube. These two elements and their relationship are seen in FIGURE 1. The thermocouple is employed to obtain a longitudinal temperature profile. The thermocouple protection tube is maintained within the reactor tube by packing glands at points outside the hot zone. The reactor tube is made of alumina and positioned within the graphite resistance element designed to use a low voltage electrical current up to 3 kva., thus providing sufficient heat to effect the maximum temperature within the reactor tube as described hereinabove, e.g. 1750° C. The annulus positioned between the larger diameter reactor tube, thus constitutes the reactor cross section.

Successive cylindrical walls of insulation material are positioned about the graphite heating element. Thus, for example, refractory walls of zirconia and aluminum silicate, together with an intermediate radiation shield of stainless steel and a furnace outer wall of copper, are desirably employed. The outer wall of the reactor is desirably water cooled. A window is positioned in the outer wall of the reactor to permit observation by an optical pyrometer sighting on the reactor tube (through a slit in the graphite resistance element), thus providing means for determining the temperature thereof.

Upon leaving the reaction zone, the gaseous effluent stream enters the quenching chamber where rapid cooling of the hot product gas to a temperature in the range of 600° C. to 300° C. or less is caused to occur as described above. As noted earlier, quenching is effected most desirably at this point by cold fluid injection, either gaseous or liquid. In this particular system, using methane and hydrogen as a feed mixture, the hot effluent product gases are quenched with a portion of the effluent which has been withdrawn, cooled and recycled by the recycle pump to the quench chamber. Additional cooling may be achieved by water cooling of the outer metallic surface of the quenching chamber. Analysis of the gaseous components in the product effluent is accomplished by gas chromatography and/or mass spectroscopy.

It will be evident, that suitable systems and reactors may be employed for the practice of this invention so long as they provide for adequate heat transfer rates into the gaseous feed phase, and adequate and immediate quenching of the reaction following the reaction zone of the reactor.

Suitable devices may include, among others, those containing a reaction zone formed of: a space between narrow heated channels of high temperature refractories; a space between regularly disposed heated rods of carbon or high temperature refractory; or a space between previously heated small particles in a moving stream; as well as the type of annulus reactor employed in the present description of the invention. The reactor device employed must include a method to bring the means of heating up to a reasonably uniform high temperature within the reaction zone, so that the gas being pyrolyzed is not substantially decomposed at temperatures below that desired. Heating means should also be so disposed that a minimum pressure drop occurs in the apparatus, so that the beneficial effect of hydrogen dilution in reducing partial pressure is not lessened.

The disappearance of methane in the present process occurs through a first order, homogeneous, gas phase pyrolytic reaction, the rate of which, it has been found, may be approximated by:

$$k = 0.3 \times 10^{12} e^{-75,400/RT} \text{sec.}^{-1}$$

wherein, R is the gas constant and T is in degrees Kelvin. This is in good agreement with the data published in the literature for the homogeneous, gas phase decomposition of methane; these data have been obtained over a wide range of temperatures and pressures, in many varying types of systems with surfaces of different nature, over a very wide range of surface to volume ratios and greatly varying length to diameter (or cross section) ratios.

There are in addition, many references to what appear to be the catalytic decomposition of methane wherein the rates of decomposition are much higher and others in which the yield of coke or high molecular weight hydrocarbons is substantially higher. Since the results herein presented agree so well with the results for a homogeneous reaction, it appears that these effects are absent here. Thus, it is suggested that the process described is affected by the close approach to an isothermal reaction zone, by close control over reaction time and by an effect of hydrogen which causes the decomposition of methane to acetylene to be favored over the decomposition to coke when the reactor is operated at pressures substantially higher than 100 mm. Hg abs.

The most common solid substance to be removed from this product effluent by a solids trap is small flakes of carbon formed as a product of pyrolysis. Only minute amounts of condensable liquid products have been found so that no provision for handling such product has been considered necessary; nor have such been used. Any suitable pumping system such as that represented diagrammatically in FIGURE 1 may be employed. Thus, the main pump may be employed to draw the feed and hydrogen diluent and product gases through the reactor and the quenching chamber. A recycle pump may be employed to recycle a part of the product through a cooler and back to the quenching chamber for the rapid and immediate cooling of the newly produced effluent product leaving the reactor. In addition, a gas sampling system may be provided downstream of the main pump including a volumetric gas meter and gas sample valve.

Figure 4:
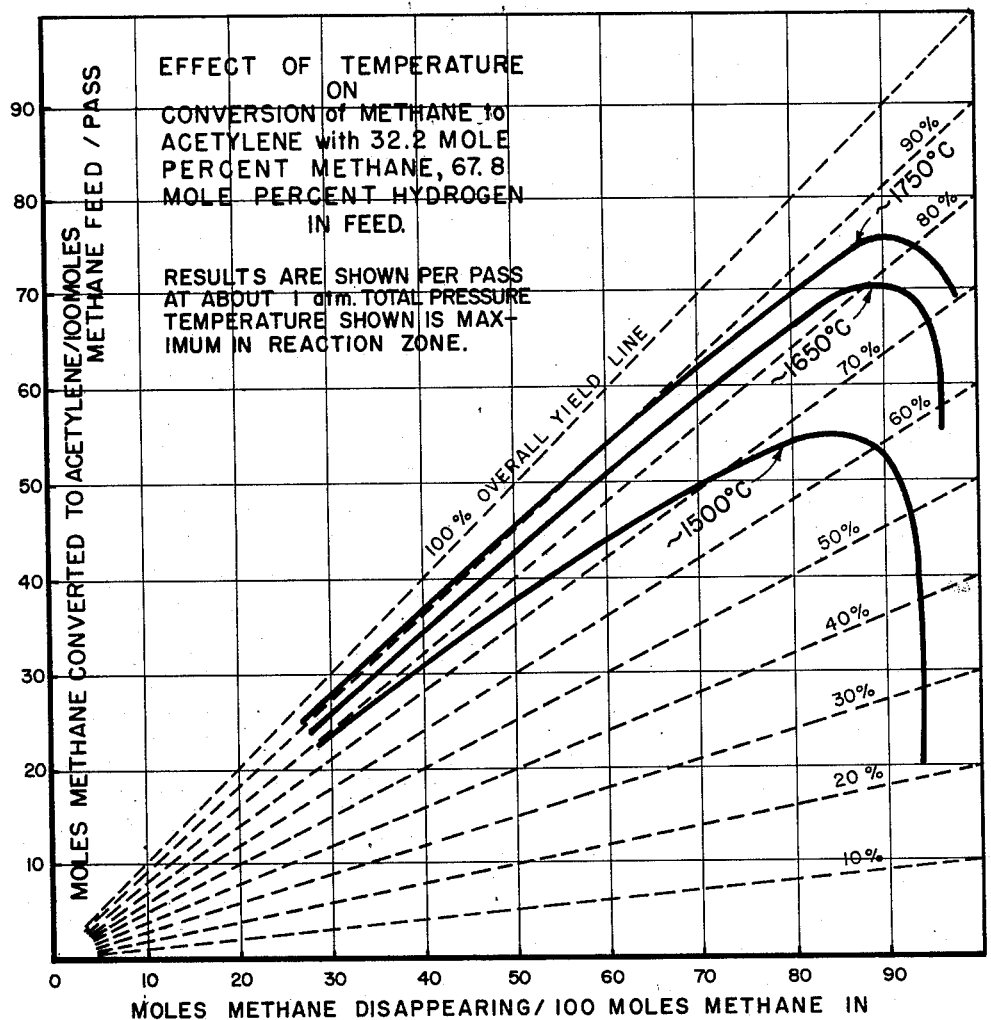
Figure 5:
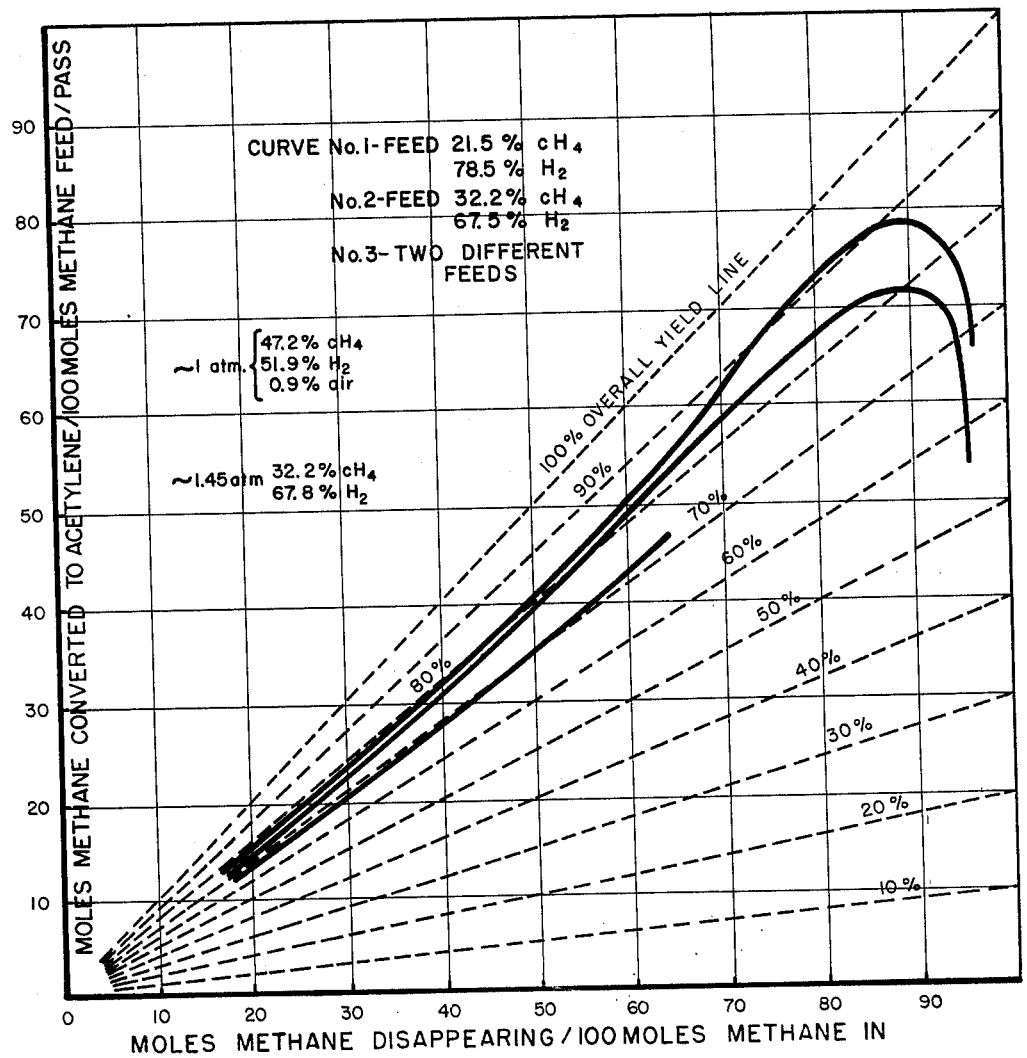

Illustrative of the conversions of methane in a methane-hydrogen feed mixture to acetylene and hydrogen accomplished in accordance with the process of the present invention, are the methane conversions illustrated graphically in FIGURES 4 and 5 of the drawings wherein the effect of temperature and of methane-hydrogen ratio in the feed, respectively, are shown. In each case, the x-axes of these graphs represent the moles of methane disappearing during pyrolysis per 100 moles of methane fed to the reactor on a once through basis. The y-axes represent the moles of methane converted to acetylene per 100 moles of methane fed to the reactor, as with the x-axes, on a once through basis or single pass through the previously defined reaction zone.

A large volume of data from numerous exemplary runs was obtained to delineate the operating conditions using hydrogen as a diluent for the methane feed. The curves on the graph shown by FIGURE 4, show the values for each of several temperatures, the temperatures being the maximum temperature within the reaction zone. Since it is experimentally difficult to fix the reaction zone maximum temperature exactly at a predetermined level, these curves actually represent series of runs within several degrees of the temperatures noted. In general, they are within 20° C. of the noted temperatures. Thus the aforesaid solid curves, drawn to be illustrative, but not limitative, of a series of maximum reactor temperatures, define results obtained at the specified conditions. In this series of runs, it is to be noted that the methane disappearance is defined by the "effective space velocity," $S_e$, for a given temperature. The conversion to acetylene will vary somewhat depending upon the rate of temperature increase prior to the maximum temperature and the rate of temperature decrease in the quenching zone, but the curves represent conditions easily attainable by conventional techniques.

The 45° straight line from the origin represents 100% yields of acetylene based on the methane content of the feed. The series of straight dotted lines at different angles from the origin show the yield in terms of the ratio of conversion to disappearance, i.e. moles of methane converted to acetylene per 100 moles of methane disappearance and each lower one has its respective value indicated. These dotted lines are based, of course, on the methane disappearing in a single pass; in effect they represent what would ultimately be expected as over-all results if all the unreacted methane in the product stream were to be continually recycled through the reactor under the same conditions. These lines represent arithmetic ratios indicating yields obtainable by recycle of unconverted methane under the same conditions.

If the tangent from the origin to each of the solid curves is drawn, in each case, it represents at the point of tangency, the maximum, over-all yield corresponding to a given reactor temperature.

It is also evident from a study of the graph shown in FIGURE 4 that within the critical limitations defined hereinabove, the relationship of critical factors may be substantially altered as desired. Thus, as shown in FIGURE 4 at 1650° C. and at 32.2 moles percent methane in the feed, the maximum in the overall conversion of methane to acetylene, i.e. based on methane disappearing only occurs at about 75% disappearance of methane; this corresponds to an overall conversion of 83.3% to acetylene with effluent methane recycled under the same conditions. This would be the optimum disappearance of methane if it were desired to conserve methane and if a 32.2% mixture of methane in hydrogen were being pyrolyzed at 1650° C. and at approximately 1 atm. abs. reactor pressure.

However, under the same conditions of feed concentration, reactor pressure, and temperature, if it were desired to obtain the maximum conversion of methane to acetylene in a single pass, this would occur at about 91% methane disappearance and would correspond to a once through conversion of methane to acetylene of about 71%. The overall yield, based on methane converted, would be 78.2%. This would be the optimum disappearance level, then, if it were not convenient or economical to recover and recycle unconnected methane through the reactor.

The maximum conversion of methane to acetylene in a single pass will always occur, for a given curve, to the right, i.e. at a higher disappearance of methane, of the conversion at which the maximum yield of acetylene based on methane disappearing falls. One explanation is that this may be due to the fact that at the lower "effective space velocity" necessary for the higher disappearance of methane, some part of the acetylene produced has been decomposed or otherwise reacted so that it does not leave the reactor as acetylene.

Additionally it may be desirable to make the product gas composition such that after acetylene removal a relatively pure hydrogen stream will remain with very small amounts of methane present therein. This may especially be true where relatively large amounts of hydrogen are included into the feed as diluent. Thus, if it is desired to eliminate as much methane as possible from the effluent, reasonable yields of acetylene can be produced at even higher methane disappearance than that at which the maximum conversion to acetylene per pass occurs. Thus, at 96% methane disappearance and otherwise at the same conditions, 60% conversion to acetylene occurs; the overall yield for this set of conditions is about 62.6%. It is also clear from the curves that even more favorable yields of acetylene per pass, and also on an overall basis may be achieved by raising the temperature to a higher level in the reactor zone.

Thus, the graph shown in FIGURE 4, defines the conditions for any desired operation, i.e. maximum conversion per pass to acetylene, maximum yield of acetylene with methane recycle, and minimum unconverted methane in the effluent. It should be noted that the illustration as shown in FIGURE 4 is for a 67.8% hydrogen, 32.2% methane (moles) mixture at substantially 1 atm. abs. reactor pressure.

In some cases, it may be desirable, to operate at substantially different ratios of methane to hydrogen than those in the mixture described in the preceding example, i.e. in FIGURE 4.

The effect of methane-hydrogen ratios is shown graphically in FIGURE 5, wherein, at 1650° C. and substantially 1 atm. abs. reactor pressure, the pyrolysis of a mixture of 21.5% methane and 78.5% hydrogen is compared with a mixture of 32.2% methane and 67.8% hydrogen under substantially the same conditions of reactor temperature and pressure. It is clear from FIGURE 5, that at 1 atm. abs. reactor pressure, the effect of increasing the ratio of hydrogen to methane will affect the once through and overall yields of acetylene in a manner similar to that of increasing the reactor temperature. This effect may be caused by the increased stability of acetylene at the higher hydrogen to carbon ratios in the feed or to the fact that the concentration of acetylene in the effluent gas is lower, and hence acetylene will react more slowly. Thus it has been found that by raising the average reactor pressure to about 1.45 atm. abs. with a feed consisting of 32.2% methane and 67.8% hydrogen and the reactor at about 1650° C., the resulting conversion versus disappearance curve, see FIGURE 5, bottom curve, fell substantially below the 32.2% methane curve at 1 atm. abs. Since the partial pressure of methane in the feed at 1.45 atm. abs. total pressure is almost 0.47 atm., it appears that only a part of the hydrogen dilution effect with regard to the acetylene yield is caused by the decreased partial pressure of the components of the mixture, other than hydrogen.

It is thus clear that the optimum pyrolysis process need not consist of a single reactor or a single set of reaction conditions used in a plurality of reactors. For example it may be desirable to alter the conditions of temperature, pressure and methane concentration in a series of reactors. This is another of the embodiments of the invention contemplated. Thus, for example, methane at the highest concentration could be partially pyrolyzed at very high temperatures at a methane disappearance level where the efficiency of methane utilization would be highest. After stripping acetylene from the effluent (and ethylene, if desired), the effluent would consist of methane more highly diluted with hydrogen. This mixture could then be pyrolyzed at a lower temperature, again with a high efficiency of methane utilization. After stripping acetylene from this stream, a very dilute stream of methane in hydrogen could be compressed to pressures substantially higher than atmospheric pressures and pyrolyzed in a reactor in which practically all methane would disappear.

It should be noted that the maximum yields referred to in the discussion relating to FIGURES 4 and 5 hereof and while indicative of those had on the average, do not necessarily represent the highest yields attainable within the purview of the present invention on a single run or as the result of a plurality of such runs.

The following examples taken from the large number of experimental determinations which were made to define the curves of FIGURES 4 and 5, and further illustrative of the invention. In each example, the terms $C_0$, $C_A$, $C_E$, and $Y_A$ which appear, are defined as follows:

$C_0$ = moles of methane disappearance per 100 moles of methane feed per pass $C_A$ = moles of methane converted to acetylene per 100 moles of methane feed per pass $C_E$ = moles of methane converted to ethylene per 100 moles of methane feed per pass $Y_A$ = moles of methane converted to acetylene per 100 moles methane disappearance Further, the analyses presented do not include other hydrocarbons, some of which appeared in all runs, but to the extent generally of about 0.4% (mole) or less and which in no case in total did not exceed about 1%. Also, solid carbon is not shown in these analyses.

EXAMPLE 1.—EFFECT OF TEMPERATURE VARIATION

A gas containing 32.2% (mole) methane and 68.8% (mole) hydrogen was passed through a reactor of the type described hereinabove. As defined above, the reaction zone is that zone which starts at a temperature about 250° C. below the maximum temperature observed in the reaction zone, and ends at the point of quench. The volume of the reaction zone is $V_f$; the space velocity, $Sv$, is taken as the total flow of gas measured at 0° C., 760 mm. Hg abs. in cubic feet/sec., fed to this defined reaction zone divided by the reaction zone volume in cubic feet. "Effective space velocity," $Se$, is taken as:

$$Se = \frac{Sv}{P} = \text{sec.}^{-1}\text{ atm.}^{-1}$$

where P is the total reactor pressure in atmospheres. In this example, the total reactor pressure is about 1 atm. abs.

Part IA

The maximum temperature observed in the reactor is 1660° C. $Se=14.5$ sec.$^{-1}$ atm.$^{-1}$. Under these operating conditions, the effluent gas has the following analysis (mole):

Hydrogen _____ 88.4
Methane _____ 1.92
Acetylene _____ 8.90
Ethylene _____ 0.51
                                         99.73

Under these conditions, therefore, the once through results are:

$C_0 = 92.4$
$C_A = 71.5$
$C_E = 4.1$

The overall yield (i.e. based on methane disappearing) of acetylene from methane is:

$Y_A = 77.3$

Part IB

This experiment is conducted at the same conditions as IA but the maximum temperature in the reactor is about 1740° C. and $Se=30.6$ sec.$^{-1}$ atm.$^{-1}$. Under these conditions, the effluent gas analysis is:

Hydrogen _____ 87.1
Methane _____ 2.46
Acetylene _____ 9.78
Ethylene _____ 0.29
                                         99.63

The above analysis corresponds to the following conversions:

$C_0 = 90.2\%$
$C_A = 78.2\%$
$C_E = 9.3\%$
$Y_A = 86.8\%$

Part IC

Using the conditions of Example IA, but at a maximum temperature in the reactor at 1520° C. and at $Se=2.65$ sec.$^{-1}$ atm.$^{-1}$, the following results are obtained. The effluent gas analysis is (mole percent):

Hydrogen _____ 90.0
Methane _____ 2.49
Actylene _____ 6.63
Ethylene _____ 0.75
                                         99.87

The above figures correspond to:

$C_0 = 90.2$
$C_A = 52.6$
$C_E = 5.9$
$Y_A = 58.4$

EXAMPLE 2.—EFFECT OF METHANE-HYDROGEN RATIO VARIATION

At approximately 1 atmosphere absolute pressure, a maximum reaction zone temperature of 1650° C. and at $Se=28.1$, with 21.5% (mole) methane in a methane-hydrogen feed mixture, the effluent from the reaction zone analyzes as follows:

Hydrogen _____ 90.2
Methane _____ 2.23
Acetylene _____ 7.20
Ethylene _____ 0.32
                                         99.95

The above analysis corresponds to:

$C_0 = 87.5$
$C_A = 78.5$
$C_E = 4.0$
$Y_A = 89.8$

EXAMPLE 3.—EFFECT OF INCREASED TEMPERATURE

At approximately 1 atmosphere absolute pressure and with the maximum reactor temperature approximately 1850° C., a gas consisting of 21.5% methane in a methane-hydrogen mixture is passed through the reaction zone. $Se=30.5$ sec.$^{-1}$ atm.$^{-1}$. Under these conditions, the effluent gas analyzed as follows (mole percent):

| | |
|---|---|
| Hydrogen | 91.9 |
| Methane | 0.40 |
| Acetylene | 7.20 |
| Ethylene | 0.28 |
| | 99.78 |

This corresponds to conversion figures of:

$C_0=97.8$
$C_A=80.9$
$C_E=3.1$
$Y_A=82.8$

EXAMPLE 4.—EFFECT OF INCREASED REACTOR PRESSURE

A mixture of hydrogen and methane containing 0.322 mole fraction methane is passed through the reaction zone at an average pressure of 1.45 atmospheres absolute pressure at a maximum reactor temperature of $Se=25.1$. Under these conditions, the effluent gas analyzed as follows (mole percent):

| | |
|---|---|
| Hydrogen | 83.4 |
| Methane | 9.19 |
| Acetylene | 6.67 |
| Ethylene | 0.57 |
| | 99.83 |

This analysis corresponds to:

$C_0=65.7$
$C_A=47.4$
$C_E=4.3$
$Y_A=72.1$

EXAMPLE 5.—EFFECT OF INCREASED METHANE CONCENTRATIONS

A gas containing 46.8% (mole) methane admixed with 52.4% (mole) hydrogen, 0.7% (mole) nitrogen and a small amount of $CO_2$ is passed through the reaction zone at a maximum reactor temperature of about 1725° C. The reactor pressure is essentially 1 atmosphere abs. and $Se$ corresponds to 32.8 sec.$^{-1}$ atm.$^{-1}$.

Under these conditions, the gaseous effluent analyzed as follows (mole percent):

| | |
|---|---|
| Hydrogen | 83.25 |
| Methane | 5.12 |
| Acetylene | 10.74 |
| Ethylene | 0.45 |
| | 99.56 |

This corresponds to conversion figures of:

$C_0=84.9$
$C_A=63.5$
$C_E=2.7$
$Y_A=74.8$

EXAMPLE 6.—EFFECT OF DECREASED METHANE CONCENTRATIONS

A gas containing about 2.45% (mole) methane, 97.4% (mole) hydrogen and about 0.15% nitrogen is passed through the reaction zone about 1635° C. at a rate corresponding to $Se=2.23$ sec.$^{-1}$ atm.$^{-1}$. At essentially one atmosphere, the gaseous effluent contained the following mole percent:

| | |
|---|---|
| $H_2$ | 99.0 |
| $CH_4$ | 0.51 |
| $C_2H_2$ | 0.34 |
| $C_2H_4$ | 0.11 |

This analysis corresponds to:

$C_0=79.1$
$C_A=27.8$
$C_E=9.1$
$Y_A=35.2$

EXAMPLE 7.—EFFECT OF NITROGEN ADDITIONS

At a maximum observed temperature of 1780° C., a gas consisting of about 34.9% $H_2$ (mole), 32.5% $CH_4$ (mole) and 32.6% nitrogen (less than 0.1% each of $O_2$ and $CO_2$ were also present) was passed through the reaction zone at a rate corresponding to $Se=23.7$ sec.$^{-1}$ atm.$^{-1}$. The reactor pressure was essentially one atmosphere abs. Under these conditions an effluent gas containing the following mole percent is obtained:

| | |
|---|---|
| Hydrogen | 65.9 |
| Methane | 9.39 |
| Acetylene | 8.33 |
| Ethylene | 0.25 |

Other hydrocarbon gases were present, each to the extent of 0.4% or less and the effluent contained about 25% nitrogen.

Based on the methane fed, this analysis corresponds to:

$C_0=98.4\%$
$C_A=67.6\%$
$C_E=2.0\%$
$Y_A=68.7\%$

What is claimed is:

1. A process for the pyrolysis of mixtures of methane and hydrogen to produce essentially only acetylene and hydrogen which comprises heating at a total pressure at least atmospheric, a mixture of substantially pure methane and hydrogen having proportions of hydrogen to methane in the range of 1:1 to 39:1 mole ratios within a substantially isothermal pyrolysis reactor, in which the principal part of the pyrolysis occurs and wherein the maximum temperature of the reaction zone is at least 1450° C. up to 2000° C., the reaction zone being essentially isothermal in that heat is being added to crack the gas in its passage through the reaction zone, the beginning of the pyrolysis reaction zone being that point at which the temperature of the said mixture reaches a level of about 250° C. below the maximum temperature in the pyrolysis reactor, the effective space velocity of said mixture through said reaction zone being within the range of 0.72 to 70.7 sec.$^{-1}$ atm.$^{-1}$.

2. A process for the pyrolysis of methane to produce essentially only acetylene and hydrogen which comprises heating at about atmospheric pressure a mixture consisting substantially of substantially pure methane and hydrogen in the mole ratios of 1:1 to 39:1 hydrogen to methane within a substantially isothermal pyrolysis reactor, in which the principal part of the pyrolysis occurs and wherein the maximum temperature of the reaction zone is at least 1500° C. up to 1800° C., the reaction zone being essentially isothermal in that heat is being added to crack the gas in its passage through the reaction zone, the beginning of the pyrolysis reaction zone being that point at which the temperature of the said mixture reaches a level of about 250° C. below the maximum temperature in the pyrolysis reactor, the effective space velocity of said mixture through said reaction zone being within the range of 0.72 to 70.2 sec.$^{-1}$ atm.$^{-1}$.

3. A process for the pyrolysis of methane to produce essentially only acetylene and hydrogen which comprises heating at at least atmospheric pressure a mixture of substantially pure methane, hydrogen, and nitrogen the mole ratios of hydrogen to methane being 1:1 to 39:1 within a pyrolysis reactor, in which the principal part of the pyrolysis occurs and wherein the maximum temperature of the reaction zone is at least 1450° C. up to 2000° C., the reaction zone being essentially isothermal in that heat is being added to crack the gas in its passage through the reaction zone, the beginning of the pyrolysis reaction zone being that point at which the temperature of the said mixture reaches a level of about 250° C. below the maximum temperature in the pyrolysis reactor, the effective space velocity of said mixture through said reaction zone being within the range of 0.50 to 100 sec.$^{-1}$ atm.$^{-1}$.

4. A process for the pyrolysis of mixtures containing substantially methane and hydrogen to produce essentially only acetylene and hydrogen which comprises heating at pressures of 1 to 5 atmospheres a mixture of substantially pure methane and hydrogen in mole ratios of 1:1 to 39:1 hydrogen to methane within a pyrolysis reactor, in which the principal part of the pyrolysis occurs and wherein the maximum temperature of the reaction zone is at least 1450° C. up to 2000° C., the reaction zone being essentially isothermal in that heat is being added to crack the gas in its passage through the reaction zone, the beginning of the pyrolysis reaction zone being that point at which the temperature of the said mixture reaches a level of about 250° C. below the maximum temperature in the pyrolysis reactor, the effective space velocity of said mixture through said reaction zone being within the range of 0.72 to 70.7 sec.$^{-1}$ atm.$^{-1}$ and thereafter quenching the gaseous products to a maximum temperature of at least 600° C.

5. A process for the pyrolysis of methane to produce acetylene and hydrogen which comprises heating at at least atmospheric pressure a mixture of substantially pure methane, hydrogen, and nitrogen the mole ratios of hydrogen to methane being 1:1 to 39:1, within a pyrolysis reactor, in which the principal part of the pyrolysis occurs and wherein the maximum temperature of the reaction zone is at least 1500° C. up to 1800° C., the reaction zone being essentially isothermal in that heat is being added to crack the gas in its passage through the reaction zone, the beginning of the pyrolysis reaction zone being that point at which the temperature of the said mixture reaches a level of about 250° C. below the maximum temperature in the pyrolysis reactor, the effective space velocity of said mixture through said reaction zone being within the range of 0.72 to 70.7 sec.$^{-1}$ atm.$^{-1}$, and thereafter quenching the gaseous products.

6. A process for the pyrolysis of mixtures containing methane to give essentially pure mixtures of acetylene and hydrogen only in mole ratios of 1:1 to 39:1 hydrogen to methane, which comprises heating a mixture consisting substantially of substantially pure methane and hydrogen within a pyrolysis reactor, in which the principal part of the pyrolysis occurs and wherein the maximum temperature of the reaction zone is at least 1500° C. up to 1800° C., the reaction zone being essentially isothermal in that heat is being added to crack the gas in its passage through the reaction zone, the pyrolysis reactor beginning at that point at which the temperature of the feed mixture reaches a temperature of about 250° C. below the maximum temperature in the pyrolysis reactor, and a pressure from about atmospheric up to five atmospheres, the effective space velocity of said mixture through said reaction zone being within the range of 0.72 to 70.7 sec.$^{-1}$ atm.$^{-1}$.

7. A process for the pyrolysis of mixtures of methane and hydrogen to produce essentially only mixtures of acetylene and hydrogen which comprises heating a mixture of substantially pure methane and hydrogen in the proportions of hydrogen to methane in the range of 1:1 to 39:1 mole ratios, within a pyrolysis reactor, in which the principal part of the pyrolysis occurs and wherein the maximum temperature of the reaction zone is at least 1500° C. up to 1800° C., the reaction zone being essentially isothermal in that heat is being added to crack the gas in its passage through the reaction zone, the pyrolysis reactor beginning at that point at which the temperature of the feed mixture reaches a temperature of about 250° C. below the maximum temperature in the pyrolysis reactor, and pressures up to five atmospheres, the effective space velocity of said mixture through the reaction zone being within the range of 0.72 to 70.7 sec.$^{-1}$ atm.$^{-1}$.

8. A process according to claim 4 in which the acetylene is removed from the quenched gaseous products, to produce substantially pure hydrogen at least a part of which is recycled to supply the hydrogen to the feed mixture.

9. A process according to claim 7 in which substantially pure hydrogen is separated from the gaseous products and at least a part of which is recycled to supply the hydrogen to the feed mixture.

References Cited by the Examiner
UNITED STATES PATENTS

| | | | |
|---|---|---|---|
| 2,343,866 | 3/44 | Hincke | 260—679 |
| 2,405,395 | 8/46 | Bahlke et al. | 260—679 |
| 2,543,005 | 2/51 | Evans | 260—679 |
| 2,734,074 | 2/56 | Redman | 23—288.8 X |
| 2,790,838 | 4/57 | Schroder | 23—212 X |
| 2,823,243 | 2/58 | Robinson | 260—679 |
| 2,838,584 | 6/58 | Tsutsumi | 260—679 |
| 3,073,875 | 1/63 | Braconier | 260—679 |
| 3,093,697 | 6/63 | Kasbohm et al. | 260—679 |

ALPHONSO D. SULLIVAN, *Primary Examiner.*

JAMES H. TAYMAN, JR., MAURICE A. BRINDISI, *Examiners.*